United States Patent
Wang et al.

(10) Patent No.: US 11,431,626 B2
(45) Date of Patent: Aug. 30, 2022

(54) FORWARDING RULES AMONG LOOKUP TABLES IN A MULTI-STAGE PACKET PROCESSOR

(71) Applicant: Arista Networks, Inc., Santa Clara, CA (US)

(72) Inventors: Michael Chih-Yen Wang, Vancouver (CA); Prashanth Krishnamurthy, San Jose, CA (US); Sean Hope, Vancouver (CA); Tula Kraiser, Sunnyvale, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/137,688

(22) Filed: Dec. 30, 2020

(65) Prior Publication Data
US 2022/0109626 A1 Apr. 7, 2022

Related U.S. Application Data
(60) Provisional application No. 63/087,684, filed on Oct. 5, 2020.

(51) Int. Cl.
*G06F 15/16* (2006.01)
*H04L 45/60* (2022.01)
(Continued)

(52) U.S. Cl.
CPC ............ *H04L 45/60* (2013.01); *H04L 45/02* (2013.01); *H04L 45/20* (2013.01); *H04L 45/42* (2013.01)

(58) Field of Classification Search
CPC ......... H04L 45/60; H04L 45/02; H04L 45/20; H04L 45/42; H04L 45/00; H04L 41/22; H04L 45/7453; H04L 45/745; H04L 45/48
(Continued)

(56) References Cited

U.S. PATENT DOCUMENTS

| 2004/0008675 A1* | 1/2004 | Basso ...................... H04L 45/54 370/389 |
| 2013/0031077 A1* | 1/2013 | Liu ...................... H04L 45/7457 707/706 |

(Continued)

FOREIGN PATENT DOCUMENTS

| EP | 3786959 A1 * | 3/2021 | .......... G06F 11/1004 |
| WO | WO-2020091735 A1 * | 5/2020 | ............. G11C 15/04 |

OTHER PUBLICATIONS

Analysis of MTJ Based Ternary Content Addressable Memory With and Without Match-Line Pre-Charge Prerana Vasudev;Tanmayee M. Nerlige;Akhil Siddharth P.;M.S. Sunita 2020 IEEE International Conference on Electronics, Computing and Communication Technologies (CONECCT) Year: 2020 | (Year: 2020).*

(Continued)

*Primary Examiner* — Oscar A Louie
*Assistant Examiner* — Oluwatosin M Gidado
(74) *Attorney, Agent, or Firm* — Fountainhead Law Group P.C.

(57) ABSTRACT

Processing an ingress packet in a packet pipeline to determine a forwarding rule includes identifying a matching rule in each forwarding table in the pipeline. Prefix lengths of the respective matching rules are compared. The matching rule with the greatest prefix length serves as the basis for forwarding an egress packet.

19 Claims, 9 Drawing Sheets

(51) Int. Cl.
*H04L 45/02* (2022.01)
*H04L 45/00* (2022.01)
*H04L 45/42* (2022.01)

(58) Field of Classification Search
USPC .......................................................... 709/238
See application file for complete search history.

(56) References Cited

U.S. PATENT DOCUMENTS

2014/0086249 A1* 3/2014 Assarpour ............ H04L 45/7457
370/392
2016/0284425 A1* 9/2016 Kulkarni ................. G11C 15/00
2020/0169500 A1* 5/2020 Banikazemi ............ H04L 45/42

OTHER PUBLICATIONS

Design and analysis of 2T-2M Ternary content addressable memories M. A. Bahloul;M. E. Fouda;R. Naous;M. A. Zidan;A. M. Eltawil;F. Kurdahi;K. N. Salama 2017 IEEE 60th International Midwest Symposium on Circuits and Systems (MWSCAS) Year: 2017 | Conference Paper | Publisher: IEEE (Year: 2017).*

* cited by examiner

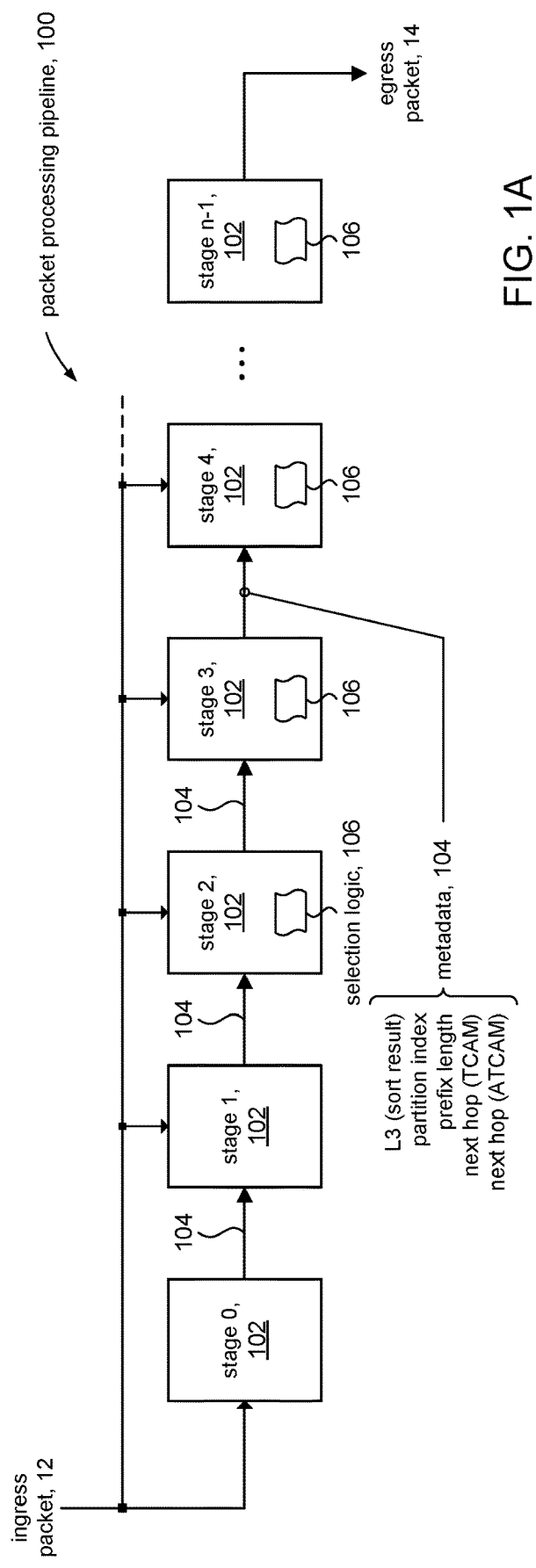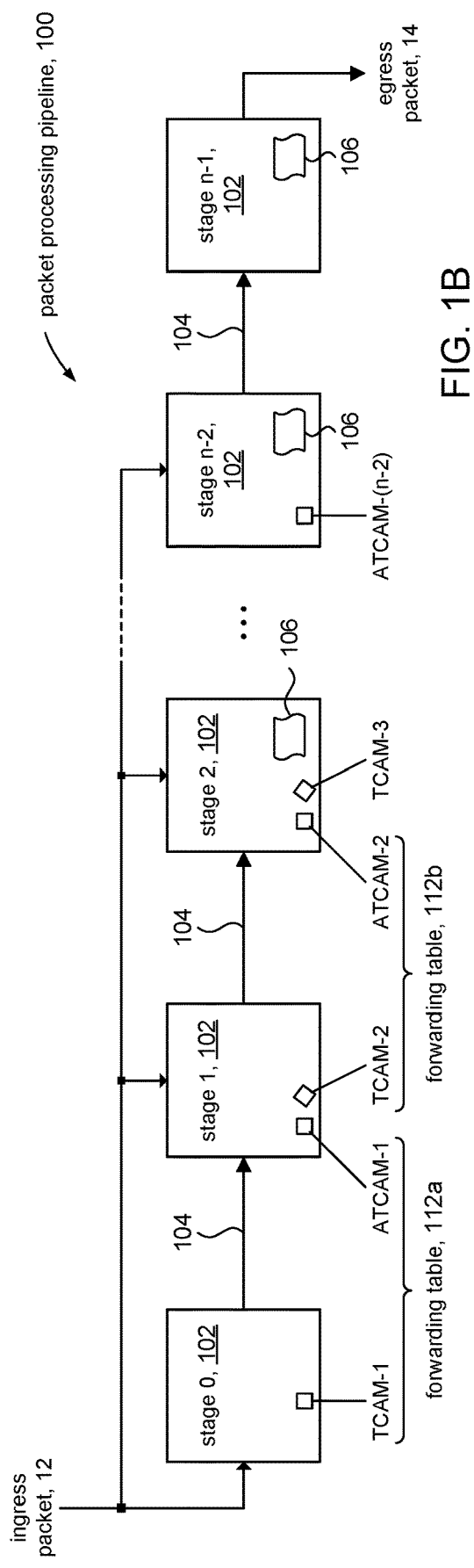
FIG. 1A
FIG. 1B

| stage 0 | stage 1 | stage 2 | stage 3 | stage 4 |
|---|---|---|---|---|
| TCAM-1 | ATCAM-1 TCAM-2 | ATCAM-2 TCAM-3 | ATCAM-3 TCAM-4 | ATCAM-4 TCAM-5 |

FIG. 5 the present disclosure may be practiced. Similar or same reference numbers may be used to identify or otherwise refer to similar or same elements in the various drawings and supporting descriptions. In the accompanying drawings:

FORWARDING RULES AMONG LOOKUP TABLES IN A MULTI-STAGE PACKET PROCESSOR

CROSS REFERENCE TO RELATED APPLICATIONS

Pursuant to 35 U.S.C. § 119(e), this application is entitled to and claims the benefit of the filing date of U.S. Provisional App. No. 63/087,684 filed Oct. 5, 2020, the content of which is incorporated herein by reference in its entirety for all purposes.

BACKGROUND

Packet forwarding in a network device such as a switch or router typically involves matching an ingress packet against a forwarding table to identify a forwarding rule. The identified forwarding rule can inform the next hop address to which an egress packet will be forwarded. Packet forwarding typically employs a pipelined architecture. In order to support large routing scale on the pipeline, the forwarding table can comprise pairs of memory blocks: a ternary content addressable memory (TCAM) table and an algorithmic TCAM (ATCAM) table distributed along the pipeline. The TCAM table can be used to perform an initial longest prefix match (LPM) on an ingress packet followed by a final LPM selection in the ATCAM. The TCAM/ATCAM pairs can be cascaded in the stages comprising the pipeline to maximize the number of forwarding tables, and hence the number of rules, that can be supported by the switch. Although TCAM/ATCAM is described, it will be appreciated that any cascading level of lookup that implements partial LPM can be used.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 1A and 1B show a packet processing pipeline in accordance with some embodiments.

FIG. 5 is a schematic representation of a packet processing pipeline in accordance with some embodiments.

DETAILED DESCRIPTION

Figure 2A:
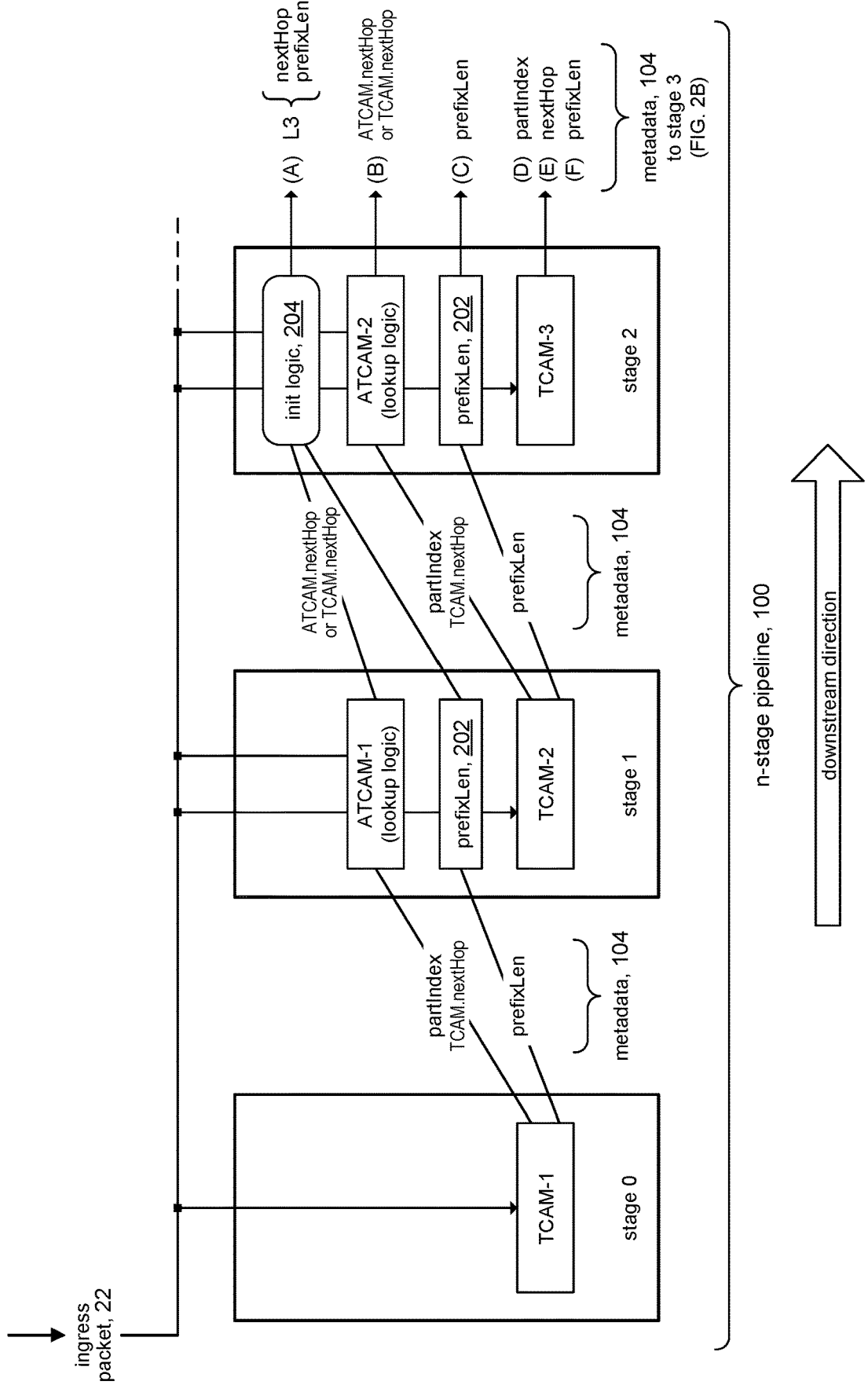
FIGS. 2A, 2B, and 2C illustrate different portions of a packet processing pipeline in accordance with some embodiments.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1A shows a packet processing pipeline in accordance with the present disclosure. Pipeline 100 in FIG. 1A, for example, can include processing stages 102 configured to process ingress packet 12 in pipeline fashion to produce egress packet 14. Processing between the stages occurs in pipeline fashion which is a well understood technology. Briefly, pipeline processing generally involves passing data between stages of the processing pipeline in lockstep fashion and is typically coordinated by a clocking component. Data in a given stage (e.g., stage 2 in FIG. 1A) is clocked into a subsequent downstream stage (stage 3) before data from a previous upstream stage (stage 1) is clocked in. Data progresses from one stage to the next in this manner along the processing pipeline. The convention used herein defines "downstream" as the direction from stage 0 toward stage n-1, and conversely the "upstream" direction is defined as the direction from stage n-1 toward stage 0.

Pipeline 100 in FIG. 1A is an n-stage pipeline configured to determine a next hop address in accordance with some embodiments of the present disclosure. The convention used herein designates the first stage in the n-stage pipeline as stage 0 and the final stage as stage n-1. Ingress packet 12 can be provided as input data to each processing stage 102 in pipeline 100. Each processing stage (e.g., stage 0) can output metadata 104 that serves as input data to the next stage (e.g., stage 1). In some embodiments, for example, metadata 104 includes one or more of: a sort result referred to as an L3data structure, a partition index, a prefix length (also referred to as "priority"), a next hop address from a ternary content addressable memory (TCAM), and a next hop address from an algorithmic TCAM (ATCAM). These data are discussed in more detail below. Briefly, the L3data structure stores next hop address (from either the TCAM or the ATCAM) and a prefix length. The partition index identifies a group of one or more subnetworks defined within a network. The prefix length refers to a notational convention referred to as Classless Inter-domain Routing (CIDR) notation. The prefix length refers to the number of most significant bits in an IP address that identify the network component of the IP address. This group of bits is the network address of the network specified in the IP address.

In accordance with the present disclosure, processing stages 102 can include selection (sort) logic 106. This aspect of the present disclosure is discussed in more detail below. Briefly, however, selection logic 106 in a given stage (stage m) can be configured to process some of the metadata received from a previous upstream stage (stage m−1) and forward the metadata to the next downstream stage (stage m+1).

Pipeline 100 includes forwarding tables to facilitate identifying the next hop address for egress packet 14. The forwarding tables store forwarding rules (rules) that can be keyed to match on information contained in ingress packet 12. In some embodiments, for example, rules can be identified based on a destination Internet protocol (IP) address contained in ingress packet 12. More generally, rules can specify one or more actions to be performed on an ingress packet, such as dropping the packet, logging information, etc. For discussion purposes, the present disclosure will consider, without loss of generality, only those rules in a forwarding table that forward packets to a next hop device.

In some embodiments, each forwarding table can be defined by a main component (portion) and an auxiliary component. The main and auxiliary components of a forwarding table can be based on any suitable memory architecture. In some embodiments, for example, the main component of a forwarding table can comprise a TCAM. The auxiliary component can comprise a static random access memory (SRAM) configured as an algorithmic TCAM (ATCAM) and associated lookup logic. In other embodiments, both the main and auxiliary components of the forwarding table can comprise pairs of TCAMs. TCAM and ATCAM architectures are known. The remaining discussion will refer to forwarding tables comprised of TCAMs and ATCAMS with the understanding that other memory architectures can be employed to implement the forwarding tables.

Referring to FIG. 1B, the TCAM/ATCAM pairs comprising each of the forwarding tables can be distributed in overlapping fashion across stages 102 of pipeline 100. Forwarding table 112a, in FIG. 1B for example, comprises TCAM-1 located in stage 0 and ATCAM-1 in a subsequent downstream stage (stage 1). Forwarding table 112b, comprising TCAM-2 and ATCAM-2, overlaps forwarding table 112a such that TCAM-2 and ATCAM-1 are co-located in stage 1, while ATCAM-2 is located in a subsequent stage (stage 2) downstream of stage 1, and so on. The final stage (stage n-1) in pipeline 100 does not have a TCAM or ATCAM.

The TCAM/ATCAM configuration shown in FIG. 1A may be more suitable in situations where TCAM resources are limited. The configuration provides hardware resource optimization by only requiring fields of the TCAM for the sorting phase and by sorting the results across matches instead of carrying multiple match results down the pipeline. It will be appreciated, however, that other configurations in accordance with the present disclosure are possible. For example, although not shown, in some embodiments the ATCAM can be omitted by using a TCAM at each stage.

Figure 2B:
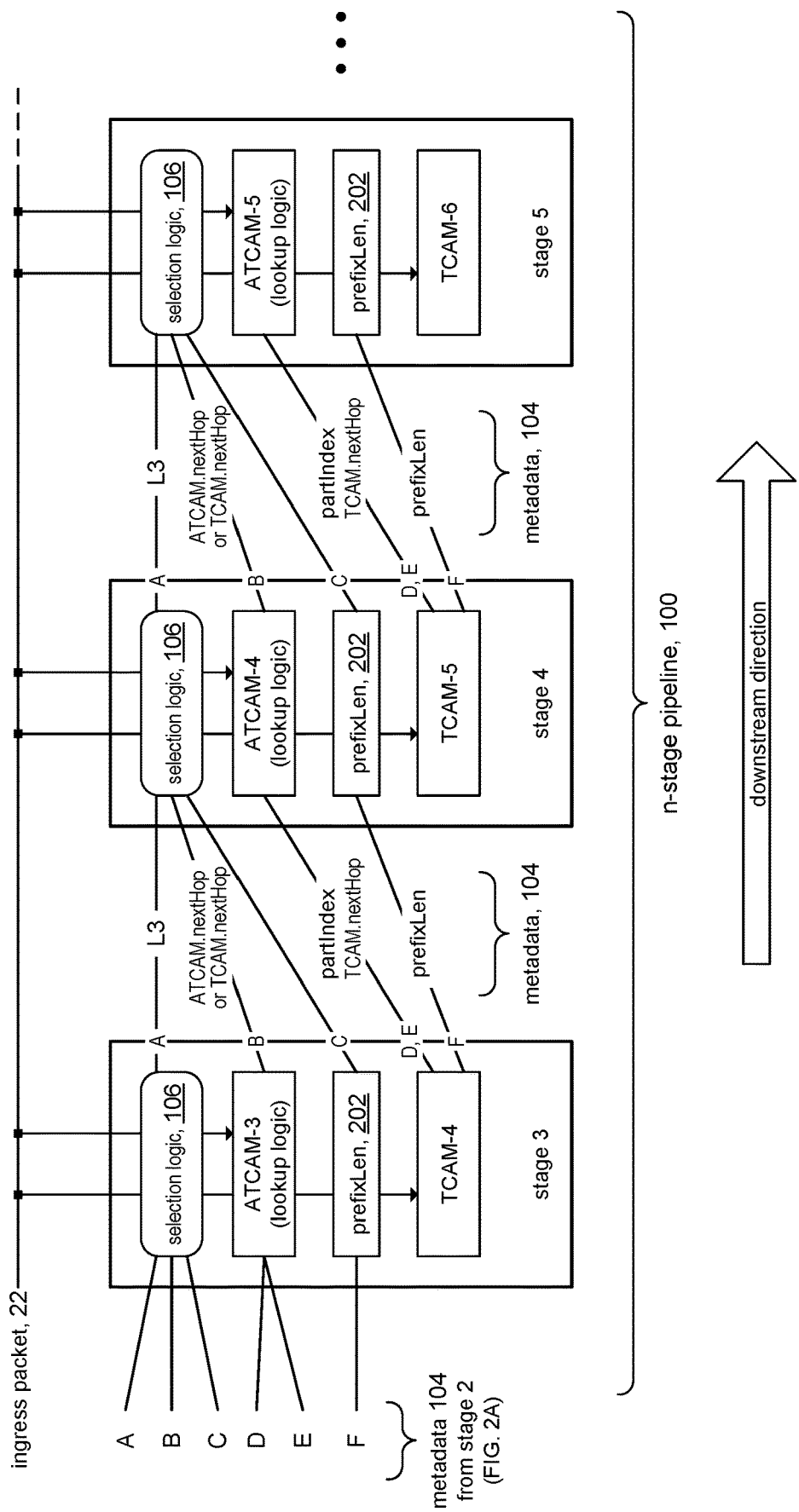
Figure 2C:
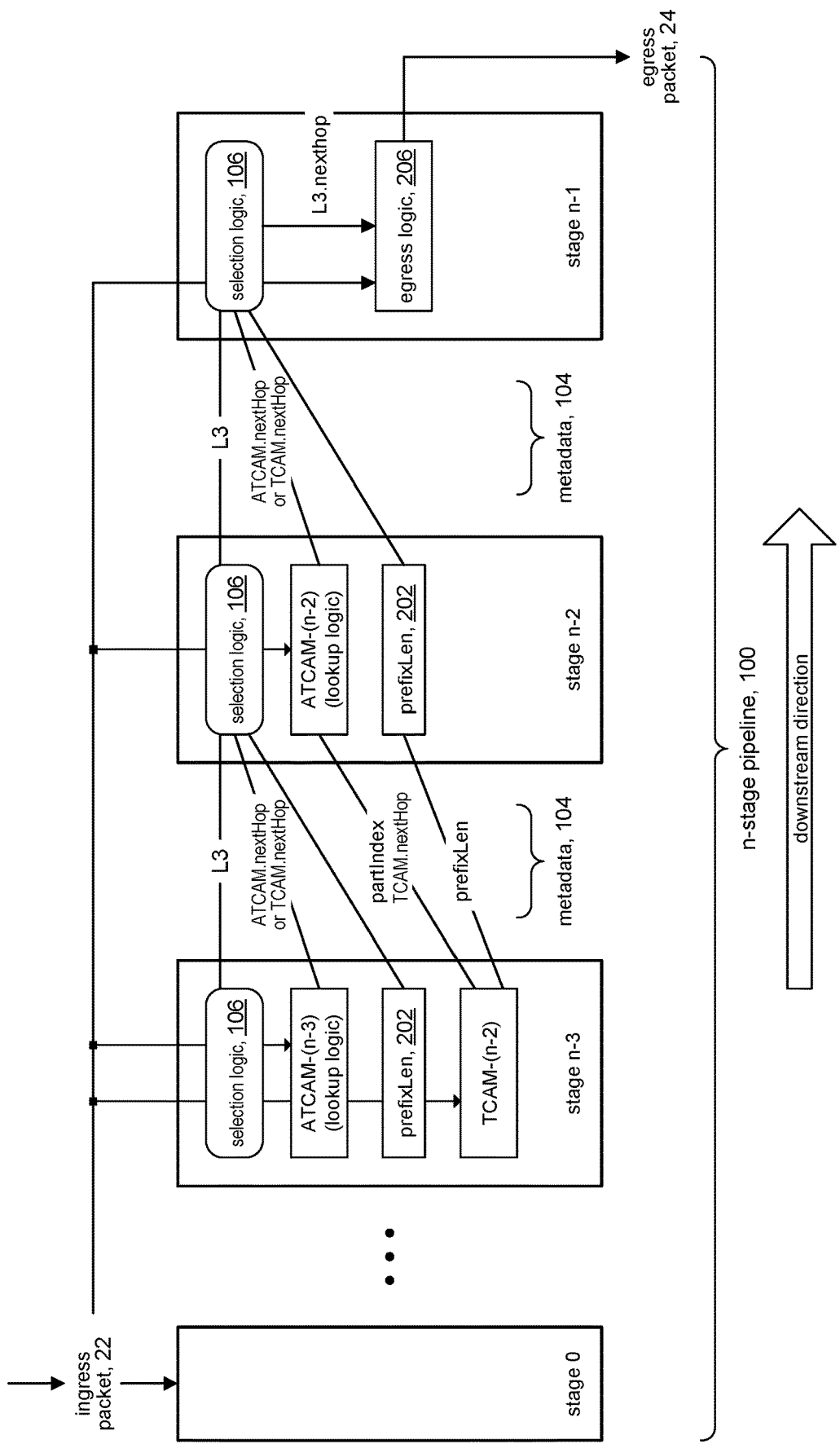

Referring to FIGS. 2A, 2B, and 2C, the discussion will now turn to a description of details of stages 102 comprising n-stage pipeline 100 in accordance with some embodiments.

In FIG. 2A, for example, stages at the beginning of pipeline 100 can be configured as shown in the figure. As explained above, the forwarding tables comprise a TCAM component and an ATCAM component. TCAM-1 in stage 0 and ATCAM-1 in stage 1, for example, constitute the first forwarding table. TCAM-2 in stage 1 and ATCAM-2 in stage 2 constitute the next forwarding table, and so on. As shown in FIG. 2C, n-stage pipeline 100 can be configured with up to (n-2) forwarding tables, although it will be appreciated that in any given embodiment, the n-stage pipeline can comprise fewer than (n-2) forwarding tables.

Stages 0, 1, and 2 in pipeline 100 can initialize metadata 104 in response to receiving an ingress packet in order to prime the pipeline. In stage 0, for example, ingress packet 22 is provided to TCAM-1 to lookup or otherwise identify a rule in the TCAM. In some embodiments, the rule can be identified based on a destination address (e.g., destination IP address) contained in ingress packet 22. The identified rule can include or otherwise be associated with various information such as a partition index, a next hop address (TCAM.NEXTHOP), and a prefix length. This information can be passed on as metadata 104 to stage 1.

Stage 1—Lookup logic associated with ATCAM-1 in stage 1 can look up or otherwise identify a rule based on (1) the destination address contained in ingress packet 22 and (2) the partition index received from the TCAM lookup in stage 0. The lookup logic can output the next hop address from the identified ATCAM rule (ATCAM.NEXTHOP) or the next hop address from stage 0 (TCAM.NEXTHOP) as an output of stage 1. The prefix length obtained from the TCAM lookup in stage 0 is provided to stage 1 and stored in prefix length data store 202 in stage 1. The content of prefix length data store 202 becomes an output of stage 1.

Stage 2—The next hop address produced by ATCAM-1 in stage 1 and the output of prefix length data store 202 in stage 1 are provided to initialization logic 204 in stage 2. The initialization logic produces an initial state for the L3data structure. The L3data structure can include members L3.NEXTHOP and L3.PREFIXLEN which are initialized with data from stage 1, namely a next hop address (TCAM.NEXTHOP or ATCAM.NEXTHOP) and the content of prefix length data store 202 respectively. The output of stage 2 are labeled A-F and provided as metadata 104 to stage 3. As will be discussed in further detail below, the L3data structure represents a selected forwarding rule. As such, it will be understood that the L3data structure can include other information associated with a forwarding rule such as an action identifier, although such additional information is not depicted to avoid cluttering the figures.

Referring to FIG. 2B, stages in pipeline 100 following stage 2 can be configured as shown in the figure. In general, processing in a given stage includes the ATCAM in the given stage receiving a partition index from a preceding (upstream) stage. The lookup logic in the ATCAM identifies a rule using the partition index and destination IP contained in ingress packet 22, and outputs a next hop address to a succeeding (downstream) stage, which is either the next hop address from the ATCAM or the next hop address from the upstream TCAM. The prefix length data store 202 in the given stage receives and stores a prefix length produced by the upstream TCAM which is then output to a succeeding (downstream) stage.

The example in FIG. 2B shows details in connection with stages 3, 4, and 5 in an n-stage pipeline. Metadata 104 (outputs A-F) from stage 2 (FIG. 2A) are provided as inputs into stage 3. For example, initialization logic 204 in stage 2 initializes the L3data structure (output A) and forwards the L3data structure to stage 3 where it becomes an input to selection logic 106 in stage 3. Likewise, the next hop address (output B) is another input to selection logic 106 in stage 3, and the prefix length value from prefix length data store 202 (output C) is a third input to the selection logic. The partition index (output D) and next hop address (output E) are provided to ATCAM-3 in stage 3. The prefix length produced by TCAM-3 (output F) is provided to prefix length data store 202 in stage 3. Stage 3, in turn, produces metadata 104 and provides the metadata to stage 4, and so on.

Processing by selection logic 106 is described below. Briefly, however, using stage 3 as an example, selection logic 106 keeps the current value of L3.NEXTHOP if the PREFIXLEN (output C) is less than L3.PREFIXLEN. Otherwise, selection logic 106 will set the value of L3.NEXTHOP to NEXTHOP (output B) and set the value of L3.PREFIXLEN to PREFIXLEN (output C). Selection logic 106 then forwards the L3data structure to stage 4, and so on.

Referring to FIG. 2C, stages at the end of pipeline 100 can be configured as shown in the figure. For example, metadata 104 produced in stage n-2 and provided to the final stage (stage n-1) can include the L3data structure produced by selection logic 106 in stage n-2, the next hop address from ATCAM-(n-2), and the prefix length from prefix length data store 202 in stage n-2. The final stage (stage n-1) can include egress logic 206 to generate egress packet 24. The next hop address for egress packet 24 can be obtained from the L3data structure produced by selection logic 106 in stage n-1.

Figure 3:
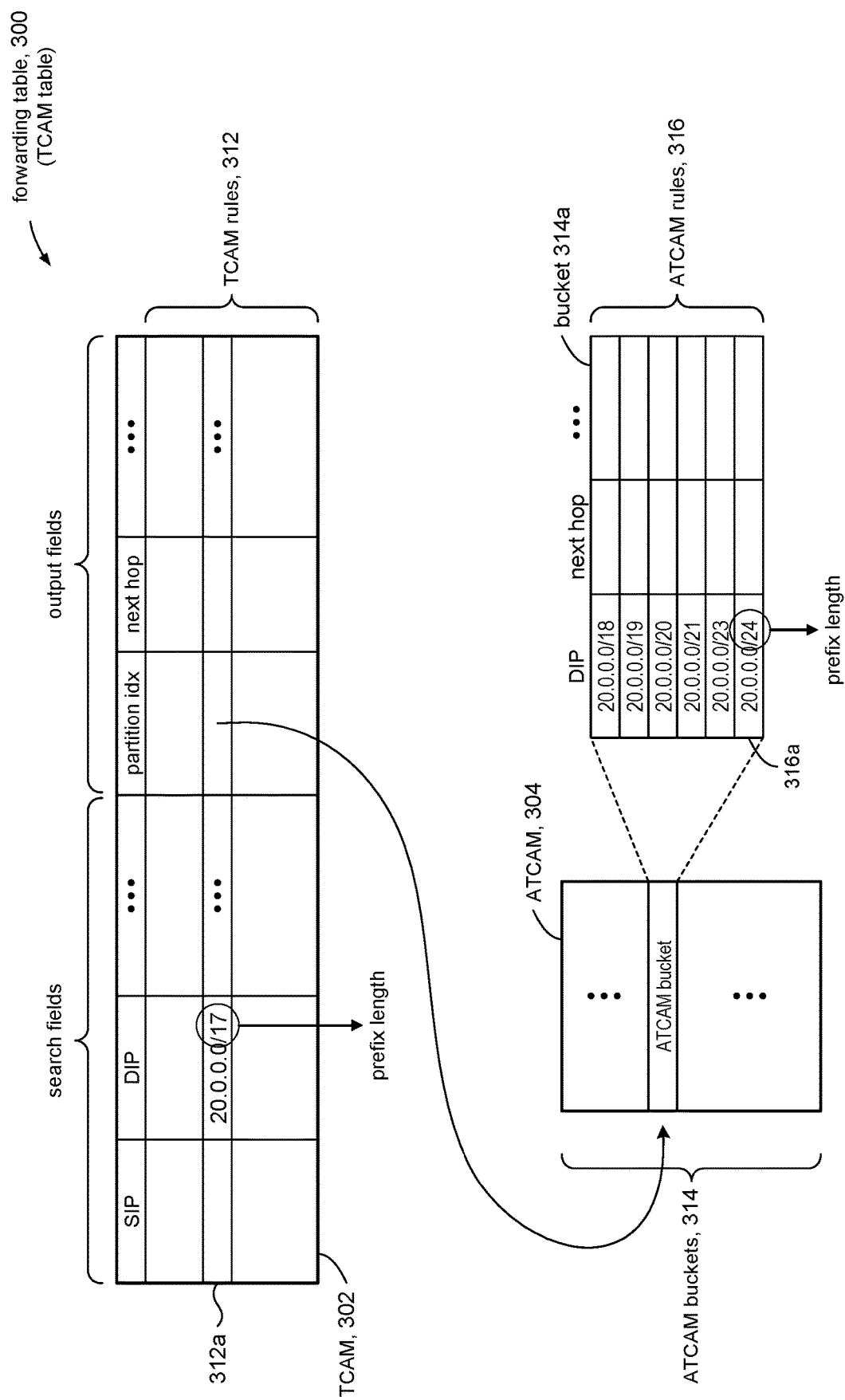
FIG. 3 shows the storage of forwarding rules in accordance with some embodiments.

Referring to FIG. 3, as noted above, a forwarding table in accordance with some embodiments can comprise a TCAM component and an ATCAM component. Forwarding (TCAM) table 300, for example, includes TCAM 302 and ATCAM 304, where TCAM 302 is in one stage in pipeline 100 and ATCAM 304 is in a subsequent downstream stage. TCAM rules 312 stored in TCAM 302 can include search fields such as source IP (SIP), destination IP (DIP), and other search fields (not shown), which can be searched to match information contained in the ingress packet to identify a rule. TCAM rules 312 can include output fields such as a partition index, next hop, and so on to direct how to process the ingress packet; for example, the next hop data field can specify a next hop address for the egress packet.

As mentioned above, a network may be segmented into several subnetworks. Each subnetwork may have its own packet processing rule. In some embodiments, the TCAM stores the highest level network address of the network that contains all the subnets. The partition index that is associated with the TCAM rule identifies the group of subnetworks defined within that network. In the context of TCAM 302 and ATCAM 304, partition indices in TCAM rules 312 point to corresponding buckets 314 in ATCAM 304. FIG. 3, for example, shows that the partition index in TCAM rule 312a points to or otherwise identifies ATCAM bucket 314a in ATCAM 304. Storing the packet processing rules in the ATCAM allows for better utilization of the TCAM.

An ATCAM bucket stores ATCAM rules 316, which can include search fields (e.g., DIP address) and output fields such as next hop address. Each rule among ATCAM rules 316 specifies a subnet (partition) of the network identified by the destination IP address in the corresponding TCAM rule. For example, the DIP in TCAM rule 312a identifies network 20.0.0.0/17. The corresponding ATCAM rules in ATCAM bucket 314a identify six subnets of network 20.0.0.0/17.

Network addresses can be represented using a common notation referred to as Classless Inter-Domain Routing (CIDR) notation, also referred to as slash notation. Briefly, the IP address is divided into two fields: a network identifier (routing prefix) and a host identifier. The slash number indicates the number of bits in the IP address that are used to specify the network identifier; the remaining bits are used to specify the host identifier. The slash number is also referred to as the prefix length. For instance, the prefix length associated with TCAM rule 312a is 17. Similarly, the prefix length associated with ATCAM rule 316a is 24.

The process of matching an ingress packet to a rule is a known process. Merely as an illustration, consider the simple example of a rule that specifies a DIP address as the matching criterion. Suppose the rule specifies a DIP address of:

128.255.14.0/18

This rule will match on an ingress packet that contains a DIP address where the first 18 bits of the address match the first 18 bits of the DIP address in the rule. In other words, the rule will match an ingress packet whose DIP address begins with the following 18-bit bit pattern:

10000000 11111111 00

Figure 4:
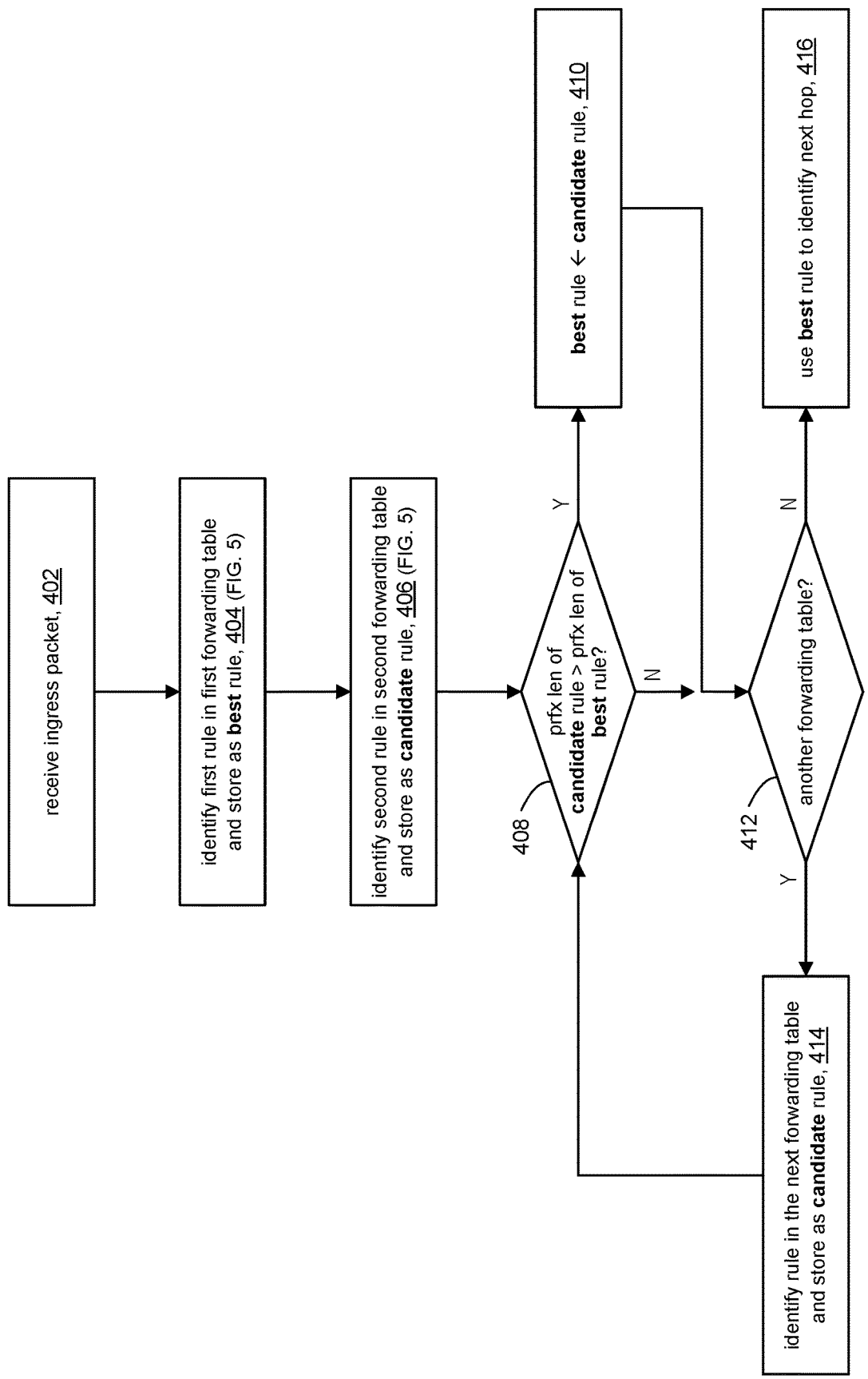
FIG. 4 shows processing in a packet processing pipeline in accordance with some embodiments.

Referring to FIG. 4 and with reference to other figures, the discussion will now turn to a high level description of processing in n-stage pipeline 100 to forward an ingress packet in accordance with the present disclosure. In some embodiments, the pipeline can include one or more digital processing units, which when operated, can cause the pipeline to perform processing in accordance with FIG. 4. Digital processing units can include specialized processors (e.g., in the data plane) such as digital signal processors, field gate programmable arrays, application specific integrated circuits, etc. that operate by way of executing computer program code or operate by way of being configured for specific operations.

The pipeline operations serve to identify the best forwarding rule for a given ingress packet. In accordance with some embodiments, the "best" rule is defined as the rule whose destination IP has the longest prefix. Merely to illustrate, suppose an ingress packet contains the following DIP address:

20.0.25.128→00010100 00000000 00011001 10000000

Using forwarding table 300 shown in FIG. 3 as an example, the ingress packet would match on the following candidates:

Rule 1: DIP=20.0.0.0/17, NEXT HOP= . . . (TCAM)
Rule 2: DIP=20.0.0.0/18, NEXT HOP= . . . (ATCAM)
Rule 3: DIP=20.0.0.0/19, NEXT HOP= . . . (ATCAM)

As explained above, Rule 1 is matched because the first 17 bits of the ingress DIP matches the first 17 bits of the DIP in Rule 1, and likewise for Rules 2 and 3. The prefix lengths associated with Rules 1, 2, and 3 are 17, 18, and 19, respectively. Accordingly, Rule 3 would be chosen as the best rule for forwarding an egress packet because it has the longest prefix match (LPM) with the ingress packet. Because the DIP address 20.0.25.128 matches on multiple rules (three rules in our example), there is a question of how to choose from among the three candidates. To handle this the convention is to select the rule with the longest prefix, which is referred to herein as the "best" rule.

Continuing with FIG. 4, the following operations apply generally to any suitable embodiment of the present disclosure. However, to illustrate the operations in the context of an illustrative embodiment, each operation will be illustrated with reference to the embodiment disclosed in FIGS. 2A-2C.

At operation 402, the pipeline processing unit can receive an ingress packet to be processed in accordance with the present disclosure to identify the next hop address for an egress packet. Referring for a moment to FIG. 2A, the flow through pipeline 100 to process ingress packet 22 can begin by providing the ingress packet to stage 0 of the pipeline.

At operation 404, the pipeline processing unit can identify (search, match) a first forwarding rule in the first forwarding table of the pipeline using the ingress packet. In accordance with some embodiments, rules will be matched using a destination IP address contained in the ingress packet. In order to set up the processing loop below, the first forwarding rule can be designated as the "best" forwarding rule. As explained above, the best forwarding rule is the forwarding rule that is used to determine the next hop address for an egress packet. Referring for a moment to FIG. 2A and continuing with the flow in pipeline 100, consider stages 0, 1, and 2:

In some embodiments, the first forwarding table can comprise TCAM-1 in stage 0 and ATCAM-1 in stage 1. Identifying the first forwarding rule can include obtaining a rule from TCAM-1 that at least partially matches a DIP address contained in ingress packet 22. The partition index and next hop address contained in or otherwise associated with the matched TCAM rule (TCAM.NEXTHOP) can be passed to the lookup logic associated with ATCAM-1 in stage 1.

The ATCAM-1 lookup logic can do a lookup using the partition index. If the partition index does not identify a bucket in ATCAM-1, then the matched TCAM rule can be deemed to be the best rule. The lookup logic can provide the next hop address associated with the matched TCAM rule (TCAM.NEXTHOP) to initialization logic 204 in stage 2 to initialize member L3.NEXTHOP in the L3data structure.

If the partition index specifies a bucket in ATCAM-1, then the lookup logic can obtain an ATCAM rule from the specified bucket that matches the DIP address contained in ingress packet 22; the obtained ATCAM rule can be deemed to be the best rule. The lookup logic can provide the next hop address contained in the obtained ATCAM rule (ATCAM.NEXTHOP) to initialization logic 204 in stage 2 to initialize L3.NEXTHOP.

The prefix length associated with the matched TCAM rule (from stage 0) can be passed to stage 1. In some embodiments, for example, the prefix length can be stored in prefix length data store 202 in stage 1. The prefix length data store can provide the stored prefix length value to initialization logic 204 in stage 2 to initialize member L3.PREFIXLEN in the L3data structure.

Initialization logic 204 in stage 2 can forward the now-initialized L3data structure to selection logic 106 in stage 3. To the extent that the best rule is used to determine the next hop for the egress packet, the L3data structure can represent the best rule because its L3.NEXTHOP member contains the next hop address.

At operation 406, the pipeline processing unit can identify a second forwarding rule in a second forwarding table in the pipeline. This rule can be designated as a "candidate" forwarding rule because it will serve as a candidate for possibly replacing the currently selected "best" forwarding rule. Referring for a moment to FIGS. 2A and 2B and continuing with the flow in pipeline 100, consider stages 1, 2, and 3:

In some embodiments, the second forwarding table can comprise TCAM-2 in stage 1 and ATCAM-2 in stage 2, and the process for identifying the second forwarding rule is the same as described above for identifying the first forwarding rule. The partition index and next hop address contained in the matched TCAM rule can be passed to the lookup logic of ATCAM-2 in stage 2.

The lookup logic can do a lookup in ATCAM-2 using the partition index. If the ATCAM-2 bucket doesn't contain a matching rule then the stage 1 TCAM-2 can provide the next hop address. In other words, the matched TCAM rule from TCAM-2 can be deemed to be the candidate rule and the lookup logic can provide the next hop address associated with the matched TCAM rule to selection logic 106 in stage 3.

If the ATCAM-2 bucket contains a matching rule, then the lookup logic can obtain an ATCAM rule from the specified bucket that matches the DIP address contained in ingress packet 22; the obtained ATCAM rule can be deemed to be the candidate rule. The lookup logic can provide the next hop address contained in the obtained ATCAM rule to selection logic 106 in stage 3 rather than the next hop address from the matched TCAM rule.

The prefix length associated with the matched TCAM rule (obtained in stage 1) can be passed to stage 2, where it is stored in prefix length data store 202 and subsequently provided to selection logic 106 in stage 3.

At decision point 408, if the prefix length associated with the candidate rule is greater than the prefix length associated with the best rule, then the pipeline processing unit can proceed to operation 410 where the candidate rule is designated as the best rule. Otherwise, the best rule remains unchanged and processing can proceed to decision point 412. Referring for a moment to FIGS. 2A and 2B and continuing with the flow in pipeline 100, consider stages 2 and 3. Decision point 408 and operation 410 can be represented by selection logic 106 in stage 3. Processing performed by the selection logic can be represented by the following pseudocode:

```
IF PREFIXLENGTH ≥ L3.PREFIXLEN{ // DESIGNATE CANDIDATE RULE AS BEST RULE
    L3.PREFIXLEN ← PREFIXLENGTH
    L3.NEXTHOP ← NEXTHOP
} // WE KEEP THE CURRENT L3.NEXTHOP
``` where the L3data structure represents the best rule and comes from initialization logic 204 stage 2, PREFIXLENGTH represents the candidate rule and comes from prefix length data store 202 in stage 2, and NEXTHOP represents the candidate rule and is either TCAM.NEXTHOP or ATCAM.NEXTHOP from stage 2.

At decision point 412, if there is another forwarding table in the pipeline, the pipeline processing unit can proceed to operation 414 to identify another rule as a candidate. Processing can then return to decision point 408 to perform another comparison. If there are no additional forwarding tables in the pipeline, then processing can proceed to operation 416. Referring for a moment to FIGS. 2A and 2B and continuing with the flow in pipeline 100, the processing can be repeated for additional stages that contain TCAM/ATCAM pairs. The best rule is represented by the L3data structure. Operation 414 can be represented in stages 2 and 3, where the next forwarding table comprises the TCAM-3/ATCAM-3 pair and the next candidate rule can be obtained as described above in connection with identifying the candidate rule in stages 1 and 2. Decision point 408 can be performed by selection logic 106 in stage 4, where the L3data structure (best rule) may be updated. Continued iterations of the loop comprising operations 408, 412, and 414 are depicted in FIG. 2B as a progression down the stages of pipeline 100.

At operation 416, as there are no further forwarding tables to be considered, the pipeline processing unit can obtain the next hop address from the best forwarding rule for forwarding an egress packet. Referring to FIG. 2C, for example, the TCAM/ATCAM pair in stages n-3 and n-2 represent the last forwarding table in pipeline 100. Operation 416 can be represented in stage n-1 (final stage), where the L3data structure provided to the final stage contains the final next hop address. Selection logic 106 in stage n-1 can provide the L3.NEXTHOP member to egress logic 206 to forward egress packet 24 to the next hop.

Conventionally, forwarding tables in a typical packet processing pipeline may be processed in a nested manner; as soon as a matching rule is found in a given forwarding table, the nested forwarding tables are not searched. Consider the schematic representation of a packet processing pipeline shown in FIG. 5, where each forwarding table comprises a TCAM/ATCAM pair. The nested rule-matching process in a conventional packet processing pipeline can be represented by the following algorithm expressed in pseudocode:

```
IF (TCAM-1.APPLYRULE.HIT) {
    ATCAM-1.APPLYRULE;
} ELSE IF (TCAM-2.APPLYRULE.HIT) {
    ATCAM-2.APPLYRULE;
} ELSE IF (TCAM-3.APPLYRULE.HIT) {
    ATCAM-3.APPLYRULE;
} ELSE IF (TCAM-4.APPLYRULE.HIT) {
    ATCAM-4.APPLYRULE;
} . . .
```

When an ingress packet hits (matches) on a TCAM then, the corresponding ATCAM can be searched to identify a matching rule. Notably, when the ingress packet matches on a TCAM, the nested TCAM/ATCAM pairs are not evaluated. For example, if the ingress packet matches on TCAM-1, then TCAM-2, TCAM-3, TCAM-4, etc. will not be searched. If the ingress packet does not match on TCAM-1, then TCAM-2 is searched; if a match occurs on TCAM-2, then TCAM-3, TCAM-4, etc. will not be searched, and so on.

When forwarding tables are searched in this nested manner, the rules that specify a network partition and its subnets are stored in the same forwarding table (TCAM/ATCAM pair). Forwarding table 300 shown in FIG. 3 represents an example, where rule 312a specifies a network partition 20.0.0.0/17, and corresponding ATCAM bucket 314a contains rules that specify the subnets of the network partition. Storing all the rules for a given network partition in a single forwarding table ensures that the rule with the longest prefix match (referred to herein as the "best" rule) will be found.

A network partition can be split across two or more forwarding tables as a new rule for subnets of the partition are added. Consider the example shown in FIG. 6, for instance, showing the rules for a network partition 20.0.0.0/17. The figure shows an initial configuration of forwarding table A comprising TCAM-1 and ATCAM-1, where TCAM-1 stores a rule for network partition 20.0.0.0/17 and ATCAM-1 stores subnets of the 20.0.0.0/17 partition. Suppose we want to add a new rule for a new subnet 20.0.0.0/22 in the partition. For the sake of discussion, suppose further that TCAM-1 and ATCAM-1 are at capacity and cannot hold any more rules. In order to accommodate the new rule for subnet 20.0.0.0/22, the rules stored in forwarding table A for network partition 20.0.0.0/17 will have to be redistributed among two or more forwarding tables.

Figure 7:
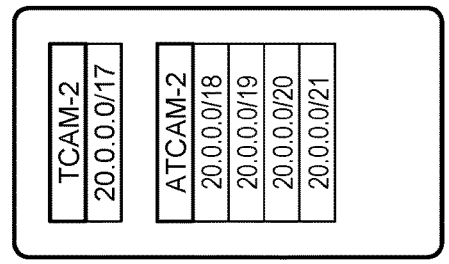
Figure 7:
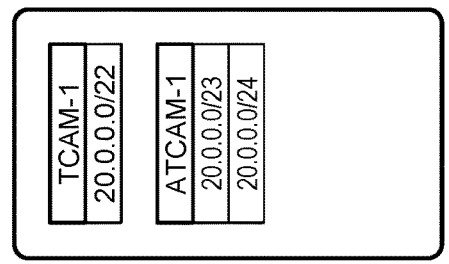

In general, when a partition is split among several forwarding tables, the redistribution of rules comprising the partition needs to be tailored to the specifics of the rule-matching algorithm of the pipeline in order to maintain LPM semantics; in other words, the best rule that matches a given ingress packet will have the longest prefix. FIG. 7, for example, shows a redistribution of rules between forwarding table A and forwarding table B that is suitable for the above-described conventional nested rule-matching algorithm. The distribution shown in FIG. 7 ensures that the LPM semantics are preserved when the nested rule-matching algorithm is applied to the forwarding tables. For example, an ingress packet having a DIP address of 20.0.1.128 will match the rule for subnet 20.0.0.0/23 as the best rule; 20.0.1.128 will match rule 20.0.0.0/22 in TCAM-1 (the first IF statement in the algorithm above will evaluate to TRUE) and so ATCAM-1 will be searched to find rule 20.0.0.0/23. Likewise, an ingress packet having a DIP address of 20.0.63.100 will match the rule for subnet 20.0.0.0/18 as the best rule. Here, rule 20.0.1.128 will not match any rule in TCAM-1 (the first IF statement in the algorithm above will evaluate to FALSE) and so the flow will fall to the second IF statement to find rule 20.0.0.0/18.

It can be appreciated that redistribution of the rules in a way that preserves LPM semantics for the nested rule-matching algorithm can require significant processing effort and computing resources. Comparing FIG. 6 and FIG. 7, for example, it can be seen that the rules for network partition 20.0.0.0/17 are completely reshuffled; the reshuffling algorithm had to determine to move the main network partition to forwarding table B and store the new sub-partition 20.0.0.0/22 in forwarding table A in order to preserve LPM semantics. As additional subnets are added to network partition 20.0.0.0/17, further fragmentation can disperse the rules for network partition 20.0.0.0/17 across even more forwarding tables. A proper redistribution of the rules with the restriction of preserving LPM semantics can become increasingly difficult and require more and more processing effort to achieve. The increased overhead can disrupt the routing/forwarding of packets.

Figure 6:
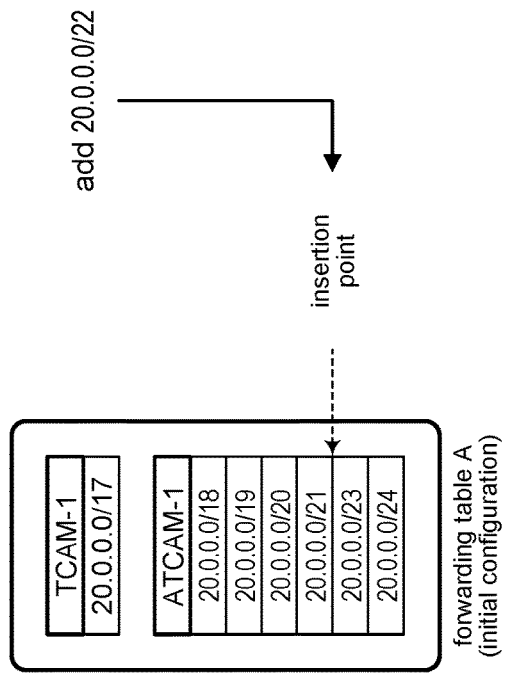
FIG. 6 shows an initial configuration of a forwarding table to illustrate an aspect of the present disclosure.
Figure 8:
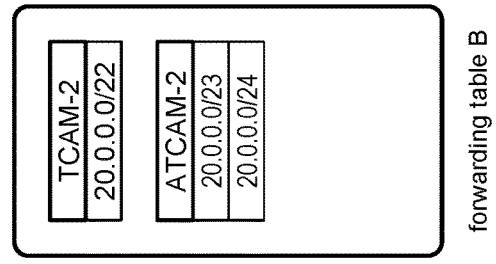
FIGS. 7 and 8 illustrate alternative redistributions of forwarding rules when a partition is split.
Figure 8:
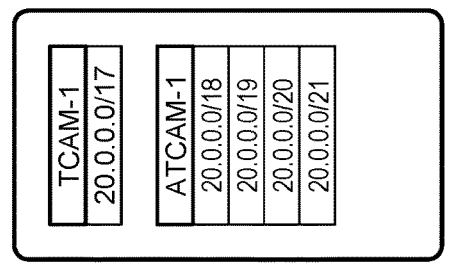

FIG. 8 shows a redistribution of rules between forwarding table A and forwarding table B that is linear and scalable as compared to the redistribution shown in FIG. 7. Referring to FIGS. 6 and 8, an insertion point is identified in ATCAM-1 where the new rule for a partition would be inserted among the existing rules of the partition in sorted order according to prefix length. The new rule and the rules starting from the insertion point are written into forwarding table B. It can be seen that the forwarding table A is largely untouched, except for the deletion of rules beginning at the insertion point that are moved to forwarding table B. The new rule 20.0.0.0/22 and the moved rules are stored in forwarding table B. There is no need to do additional reshuffling of the rules to preserve LPM semantics.

However, when the nested rule-matching algorithm described above is applied to the forwarding tables shown in FIG. 8 for DIP address 20.0.1.128, the algorithm will select 20.0.0.0/21 from forwarding table A as the "best" rule; i.e., a match will occur with rule 20.0.0.0/17 in TCAM-1 and rule 20.0.0.0/21 will be selected from ATCAM-1. The correct best rule, however, is rule 20.0.0.0/23 stored in forwarding table B. It can be seen that the nested rule-matching algorithm does not select rule 20.0.0.0/23 because the algorithm never reaches TCAM-2 (forwarding table B) due to the nested nature of the search algorithm. Moreover, the nested rule-matching algorithm will never match rules in the 20.0.0.0/22 network partition because a match will always occur with rule 20.0.0.0/17 in TCAM-1, thus preventing TCAM-2 from being searched.

By comparison, processing in accordance with the present disclosure includes applying the ingress packet to each forwarding table to identify a candidate "best" rule from a forwarding table at each stage in the pipeline. At each stage, the candidate is compared to the current "best" rule; the best rule is updated with the rule having the longer prefix match. Accordingly, processing an ingress packet with a DIP address 20.0.1.128 in accordance with the present disclosure will match on rule 20.0.0./21 in forwarding table A and will match on rule 20.0.0.0/23 in forwarding table B. Rule 20.0.0.0/23 will be selected as the best rule because its prefix length is greater than the prefix length associated with rule 20.0.0.0/21. Processing packets in accordance with the present disclosure allows for a partition to split among several forwarding tables in a linear manner without having to take into account maintaining LPM semantics.

Although not shown, it will be appreciated that in other embodiments, the sorting function collectively achieved by the stages of selection logic 106 shown in FIG. 1A can be aggregated into a sorting stage separate from the pipeline. The aggregated sorting stage can receive the prefix length and next hop (TCAM and ATCAM) data from the individual stages 102 and processed to select the best result. The aggregated sorting stage configuration can de-serialize the separate TCAM/ATCAM stages comprising the pipeline to improve pipeline throughput. The aggregated sorting stage allows for configurations where the TCAM/ATCAM stage can be further split to provide multiple parallel lookups.

Figure 9:
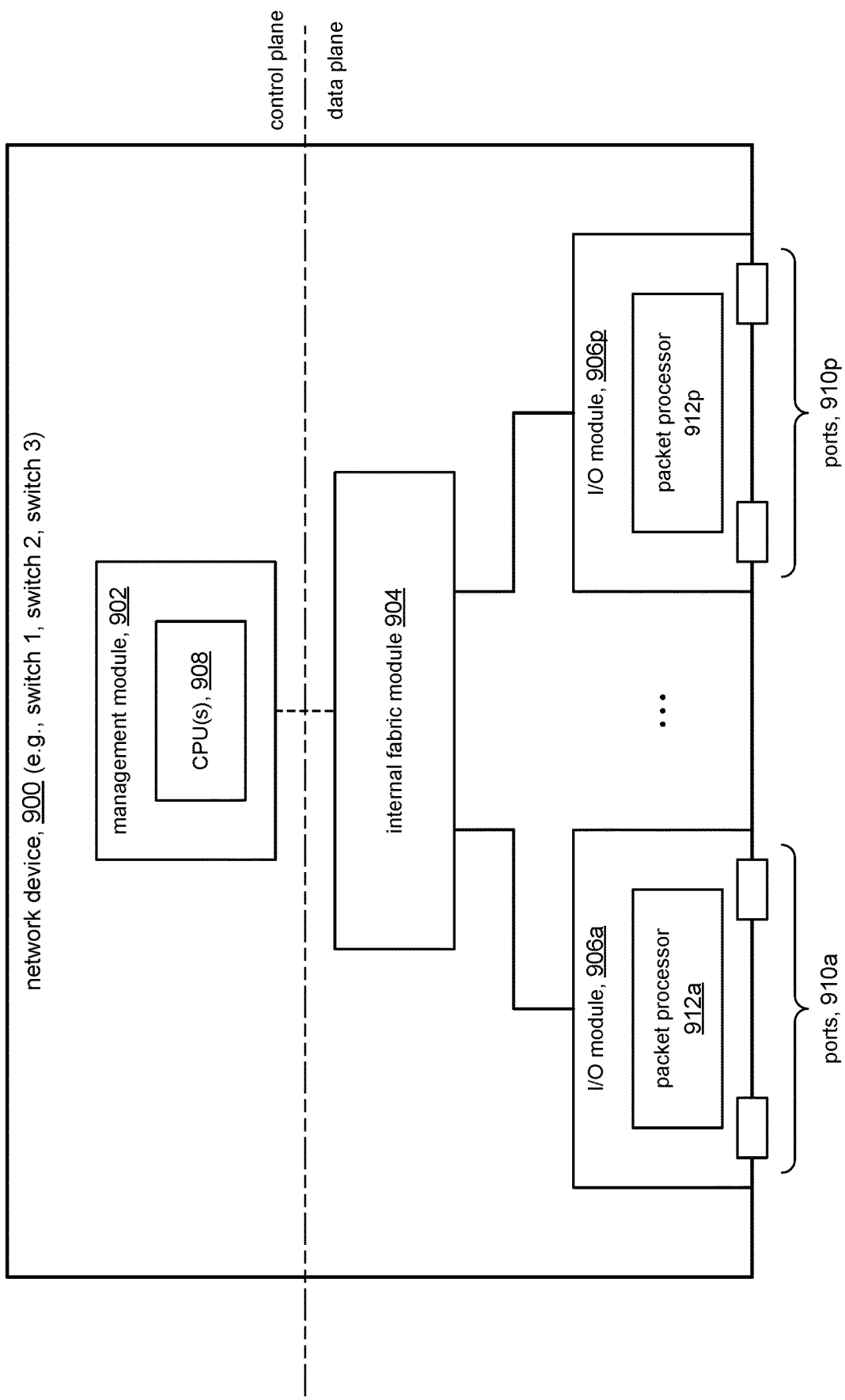
FIG. 9 shows an example of a network device that can be incorporated in a packet processing pipeline in accordance with some embodiments.

FIG. 9 depicts an example of a network device 900 that can be adapted in accordance with some embodiments of the present disclosure. In some embodiments, network device 900 can be a switch or a router. As shown, network device 900 can include a management module 902, an internal fabric module 904, and a number of I/O modules 906a-906p. Management module 902 can include the control plane (also referred to as control layer) of network device 900 and can include one or more management CPUs 908 for managing and controlling operation of network device 900 in accordance with the present disclosure. Each management CPU 908 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such as routing protocols, spanning tree, and the like.

Internal fabric module 904 and I/O modules 906a-906p collectively represent the data plane of network device 900 (also referred to as data layer, forwarding plane, etc.). Internal fabric module 904 is configured to interconnect the various other modules of network device 900. Each I/O module 906a-906p includes one or more input/output ports 910a-910p that are used by network device 900 to send and receive network packets. Each I/O module 906a-906p can also include a packet processor 912a-912p. Each packet processor 912a-912p can comprise a forwarding hardware component (e.g., packet processing pipeline 100, FIG. 1A) configured to make wire speed decisions on how to handle incoming (ingress) and outgoing (egress) network packets. In some embodiments, the forwarding hardware can comprise an application specific integrated circuit (ASIC), a field programmable gate array (FPGA), a digital processing unit, and the like.

FURTHER EXAMPLES

In accordance with some embodiments, a method in a packet processor can include applying a received ingress packet against contents of a first ternary content-addressable memory (TCAM) to identify a first rule from the first TCAM; applying the received ingress packet against a second TCAM to identify a second rule from the second TCAM; and selecting a third rule. The selecting can include selecting the third rule from an algorithmic TCAM (ATCAM) associated with the first TCAM when a prefix length associated with the first rule is greater than a prefix length associated with the second rule; and selecting the third rule from an ATCAM associated with the second TCAM when the prefix length associated with the first rule is less than the prefix length associated with the second rule. The method can further include determining a next hop address for the received ingress packet using the selected third rule.

In some embodiments, a prefix length associated with the third rule from the ATCAM associated with the first TCAM is greater than the prefix length associated with the first rule, and the prefix length associated with the third rule from the ATCAM associated with the second TCAM is greater than the prefix length associated with the second rule.

In some embodiments, the method can further include generating an egress packet and transmitting the egress packet using the next hop address.

In some embodiments, the first TCAM is in a first stage of the packet processor and the second TCAM is in a second stage of the packet processor downstream of the first stage. In some embodiments, the method can further include performing the selecting and the determining in a third stage of the packet processor downstream of the second stage.

In some embodiments, the method can further include providing the next hop address and a selected prefix length from one stage in the packet processor to a subsequent stage in the packet processor, wherein the selected prefix length is the greater of the prefix length associated with the first rule and the prefix length associated with the second rule.

In some embodiments, the method can further include using information associated with the first rule and the received ingress packet to identify the rule from the ATCAM associated with the first TCAM.

In some embodiments, the method can further include using information associated with the second rule and the received ingress packet to identify the rule from the ATCAM associated with the second TCAM.

In some embodiments, the second TCAM and the ATCAM associated with the first TCAM are co-located in one stage in the packet processor.

In accordance with some embodiments, a method can include receiving an ingress packet; identifying a first forwarding rule in a first forwarding table using the received ingress packet, the first forwarding rule having associated therewith a first next hop address and a first prefix length; identifying a second forwarding rule in a second forwarding table using the received ingress packet, the second forwarding rule having associated therewith a second next hop address and a second prefix length; selecting the first next hop address or the second next hop address as a selected next hop address depending on a longest prefix, wherein the longest prefix is the greater of the first prefix length and the second prefix length; determining a final next hop address using at least one of the selected next hop address and the longest prefix; and forwarding an egress packet using the final hop address.

In some embodiments, the method can further include using the selected next hop address as the final next hop address.

In some embodiments, the selected next hop address and the longest prefix are obtained in a first stage of a multi-stage packet processing pipeline, wherein determining the final next hop address includes providing the selected next hop address and the longest prefix from the first stage to a second stage in the multi-stage packet processing pipeline.

In some embodiments, the first next hop address is the selected next hop address when the first prefix length is greater than the second prefix length, wherein the second next hop address is the selected next hop address when the second prefix length is greater than the first prefix length.

In some embodiments, the method can further include performing a lookup on a first component of the first forwarding table to identify a bucket in a second component of the first forwarding table, the identified bucket comprising one or more rules; and selecting one of the one or more rules from the identified bucket as the first forwarding rule. In some embodiments, the first component of the first forwarding table is provided in a first stage of a multi-stage packet processing pipeline and the second component of the first forwarding table is provided in a second stage of the multi-stage packet processing pipeline.

In accordance with some embodiments, a packet processor can include a plurality of stages, where each of the plurality of stages includes selection logic and each of the plurality of stages is configured to receive from an upstream stage: a first next hop address and a first prefix length that are associated with a first forwarding rule; and a second next hop address and a second prefix length that are associated with a second forwarding rule. The selection logic in each of the plurality of stages is configured to select, as a selected next hop address, the first next hop address or the second next hop address depending on a longest prefix that is the greater of the first prefix length and the second prefix length. Each of the plurality of stages is configured to provide the selected next hop address and the longest prefix to a downstream stage; and provide a third next hop address and a third prefix length that are associated with a third forwarding rule to the downstream stage. The packet processor forwards an egress packet based on a next hop address produced by the plurality of stages.

In some embodiments, each of the plurality of stages is further configured to receive an ingress packet; obtain a forwarding rule based on information contained in the received ingress packet; provide a next hop address associated with the obtained forwarding rule to the selection logic of a downstream stage; and provide a prefix length received from an upstream stage to the selection logic of a downstream stage. In some embodiments, each of the plurality of stages is further configured to: obtain a partition index using information contained in the received ingress packet; and provide the partition index to a downstream stage, wherein the forwarding rule obtained in the downstream stage is further based on the provided partition index.

In some embodiments, each of the plurality of stages comprises a main component of a first forwarding table, wherein a partition index and a prefix length associated with a rule from the main component of the first forwarding table are provided to a downstream stage, wherein the rule from the main component of the first forwarding table is identified using information contained in a received ingress packet; and an auxiliary component of a second forwarding table, wherein a next hop address associated with a rule from the auxiliary component of the second forwarding table are provided to the selection logic in a downstream stage, wherein the rule from the auxiliary component of the second forwarding table is identified using information contained in the received ingress packet and a partition index received from an upstream stage.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a packet processor, the method comprising:
applying a received ingress packet against contents of a first ternary content-addressable memory (TCAM) to identify a first rule from the first TCAM, the first rule comprising an address that matches the ingress packet and has a network address portion of length equal to a first prefix length;
applying the received ingress packet against a second TCAM to identify a second rule from the second TCAM, the second rule comprising an address that matches the ingress packet and has a network address portion of length equal to a second prefix length;
comparing the first prefix length with the second prefix length; and
selecting a third rule, including:
selecting the third rule from an algorithmic TCAM (ATCAM) associated with the first TCAM when the first prefix length is greater than the second prefix length; and
selecting the third rule from an ATCAM associated with the second TCAM when the first prefix length is less than or equal to the second prefix length; and
determining a next hop address for the received ingress packet using the selected third rule.

2. The method of claim 1, wherein a prefix length associated with the third rule from the ATCAM associated with the first TCAM is greater than the first prefix length, and the prefix length associated with the third rule from the ATCAM associated with the second TCAM is greater than the second prefix length.

3. The method of claim 1, further comprising generating an egress packet and transmitting the egress packet using the next hop address.

4. The method of claim 1, wherein the first TCAM is in a first stage of the packet processor and the second TCAM is in a second stage of the packet processor downstream of the first stage.

5. The method of claim 4, further comprising performing the selecting and the determining in a third stage of the packet processor downstream of the second stage.

6. The method of claim 1, further comprising providing the next hop address and a selected prefix length from one stage in the packet processor to a subsequent stage in the packet processor, wherein the selected prefix length is the greater of the first prefix length and the second prefix length.

7. The method of claim 1, further comprising using information associated with the first rule and the received ingress packet to identify the rule from the ATCAM associated with the first TCAM.

8. The method of claim 1, further comprising using information associated with the second rule and the received ingress packet to identify the rule from the ATCAM associated with the second TCAM.

9. The method of claim 1, wherein the second TCAM and the ATCAM associated with the first TCAM are co-located in one stage in the packet processor.

10. A method comprising:
receiving an ingress packet;
identifying a first forwarding rule in a first TCAM (forwarding table) using the received ingress packet, the first forwarding rule comprising a first next hop address and an address that matches the ingress packet and has a network address portion of length equal to a first prefix length;

identifying a second forwarding rule in a second TCAM (forwarding table) using the received ingress packet, the second forwarding rule comprising a second next hop address and an address that matches the ingress packet and has a network address portion of length equal to a second prefix length;

selecting the first next hop address or the second next hop address as a selected next hop address depending on a longest prefix, wherein the longest prefix is the greater of the first prefix length and the second prefix length as determined by comparing the first prefix length with the second prefix length;

determining a final next hop address using at least one of the selected next hop address and the longest prefix; and forwarding an egress packet using the final hop address.

11. The method of claim 10, further comprising using the selected next hop address as the final next hop address.

12. The method of claim 10, wherein the selected next hop address and the longest prefix are obtained in a first stage of a multi-stage packet processing pipeline, wherein determining the final next hop address includes providing the selected next hop address and the longest prefix from the first stage to a second stage in the multi-stage packet processing pipeline.

13. The method of claim 10, wherein the first next hop address is the selected next hop address when the first prefix length is greater than the second prefix length, wherein the second next hop address is the selected next hop address when the second prefix length is greater than the first prefix length.

14. The method of claim 10, further comprising:
performing a lookup on a first component of the first forwarding table to identify a bucket in a second component of the first forwarding table, the identified bucket comprising one or more rules; and
selecting one of the one or more rules from the identified bucket as the first forwarding rule.

15. The method of claim 14, wherein the first component of the first forwarding table is provided in a first stage of a multi-stage packet processing pipeline and the second component of the first forwarding table is provided in a second stage of the multi-stage packet processing pipeline.

16. A packet processor comprising a plurality of stages,
each of the plurality of stages comprising a first memory, a second memory, and selection logic, wherein the first memory is a TCAM,
each of the plurality of stages configured to receive from an upstream stage:
a first next hop address and a first prefix length that are associated with a first forwarding rule stored in the first memory, wherein the first forwarding rule comprises an address that matches an ingress packet and has a network address portion of length equal to the first prefix length; and
a second next hop address and a second prefix length that are associated with a second forwarding rule stored in the second memory, wherein the second forwarding rule comprises an address that matches the ingress packet and has a network address portion of length equal to the second prefix length, and
the selection logic in each of the plurality of stages configured to select, as a selected next hop address, the first next hop address or the second next hop address depending on a longest prefix based on a comparison of the first prefix length and the second prefix length,
each of the plurality of stages configured to:
provide the selected next hop address and the longest prefix to a downstream stage; and
provide a third next hop address and a third prefix length that are associated with a third forwarding rule to the downstream stage,
wherein the packet processor forwards an egress packet based on a next hop address produced by the plurality of stages.

17. The packet processor of claim 16, wherein each of the plurality of stages is further configured to:
receive an ingress packet;
obtain a forwarding rule based on information contained in the received ingress packet;
provide a next hop address associated with the obtained forwarding rule to the selection logic of a downstream stage; and
provide a prefix length received from an upstream stage to the selection logic of a downstream stage.

18. The packet processor of claim 17, wherein each of the plurality of stages is further configured to:
obtain a partition index using information contained in the received ingress packet; and
provide the partition index to a downstream stage, wherein the forwarding rule obtained in the downstream stage is further based on the provided partition index.

19. The packet processor of claim 16, wherein each of the plurality of stages comprises:
a main component of a first forwarding table, wherein a partition index and a prefix length associated with a rule from the main component of the first forwarding table are provided to a downstream stage, wherein the rule from the main component of the first forwarding table is identified using information contained in a received ingress packet; and
an auxiliary component of a second forwarding table, wherein a next hop address associated with a rule from the auxiliary component of the second forwarding table are provided to the selection logic in a downstream stage, wherein the rule from the auxiliary component of the second forwarding table is identified using information contained in the received ingress packet and a partition index received from an upstream stage.

* * * * *